United States Patent [19]

Glore et al.

[11] Patent Number: 5,034,110
[45] Date of Patent: Jul. 23, 1991

[54] POOL CHLORINATORS

[75] Inventors: Rodney L. Gore, Everton Hills; Herbert F. Glore, St. Lucia, both of Australia

[73] Assignee: Sal-Chlor Pty. Ltd., Taringa, Australia

[21] Appl. No.: 419,965

[22] Filed: Oct. 11, 1989

[30] Foreign Application Priority Data

Oct. 11, 1988 [AU] Australia .................. PJ0870

[51] Int. Cl.$^5$ .................. C25B 9/04; C25B 15/02
[52] U.S. Cl. .................. 204/228; 204/270; 204/271; 204/275; 204/278
[58] Field of Search .................. 204/278, 270, 271

[56] References Cited

U.S. PATENT DOCUMENTS

| 3,222,269 | 12/1965 | Stanton | 204/278 X |
| 4,229,272 | 10/1980 | Yates | 204/228 X |
| 4,255,246 | 3/1981 | Davis et al. | 204/228 |
| 4,525,253 | 6/1985 | Hayes et al. | 204/271 X |
| 4,525,272 | 6/1985 | Henson | 204/228 X |
| 4,565,617 | 1/1986 | Ahuja | 204/270 X |
| 4,680,114 | 7/1987 | Hayes | 204/228 |
| 4,769,119 | 9/1988 | Grundler | 204/228 X |
| 4,936,979 | 6/1990 | Brown | 204/228 X |

FOREIGN PATENT DOCUMENTS 8601543 3/1986 World Int. Prop. O. .......... 204/271

OTHER PUBLICATIONS

Australian Patent Specification Number 43,263/72 entitled Method of and Apparatus for, Chlorinating Swimming Pool Water & Published on Dec. 13, 1972 discloses the Chloration of Swimming Pool Water by the use of Immersed Electrodes.
Australian Patent No. 569026 by Durack, discloses a device for dissolving chlorine in water by the use of coated electrodes. This Reference also discusses the problems of calcium salt plating the cathode. This Reference was also assigned to SAL-Chlor PPY Ltd., as in the Present U.S. Patent Application.

Primary Examiner—Donald R. Valentine
Attorney, Agent, or Firm—Merchant & Gould, Smith, Edell, Welter & Schmidt

[57] ABSTRACT

A self cleaning electrolytic chlorinator for swimming pools and water treatment plants comprises a low voltage D.C. power supply unit which cyclically reverses the polarity at the electrodes to shed accumulated deposits which plate out on the electrode surfaces. Damage to the delicate catalytic coating on the electrodes is prevented by stepping the applied potential from a maximum to a minimum value before changing polarity and then stepping the applied potential back to a maximum value.

21 Claims, 7 Drawing Sheets

POOL CHLORINATORS

This invention is concerned with improvements in electrolytic chlorination apparatus of the type which generate chlorine from a chlorine containing electrolyte under the influence of a potential difference between electrodes immersed in the electrolyte.

The invention is particularly although not exclusively concerned with the electrolytic chlorination of water for sanitization of swimming pool water, sources of water for drinking purposes and other water treatment plants.

The invention is particularly applicable in one aspect to improvements in "convection" chlorinators of the type described in Australian Patent No. 569,026 although it will be clear to a skilled addressee that, with appropriate modification, it will also be applicable to "in-line" chlorinators of the type generally described in Australian Patent No. 572,143.

Australian Patent No. 569,026 describes an electrolytic chlorinator which operates independently of a swimming pool filtration circuit and as a safety feature allows hydrogen gas generated at a cathode to be vented freely to the atmosphere thus avoiding the possibility of explosion due to accumulation of hydrogen in the filtration circuit. Water containing electrolyte is circulated through the body of the apparatus by convection caused by rising gas bubbles liberated at the electrodes within the body of the apparatus intermediate its inlet and outlet ports.

Whilst the apparatus of Australian Patent No. 569,026 is extremely efficient in operation and effective for its purpose, it and other in-line chlorinators all suffer from the same major disadvantage. Certain dissolved anions, particularly calcium, plate out from solution and form a thick crusty deposit on the surface of the cathode and this can rapidly reduce the rate of chlorine production to zero.

Although when compared with "in-line" chlorinators, the removal of the electrode assembly from "convection" chlorinators for cleaning purposes is substantially easier and more convenient, the necessity for frequent cleaning of electrodes to maintain adequate chlorine production is highly inconvenient to a user.

Most importantly however, frequent cleaning of the electrodes, particularly the cathode, is destructive of the catalytic coating applied to the surface of the cathode. A cathode may comprise a base of sheet titanium of a titanium wire mesh or, of more recent times, an expanded mesh of titanium formed by slitting sheet titanium at spaced intervals and then expanding the sheet under tension in a direction perpendicular to the slit direction. The expanded titanium mesh is then coated with black platinum oxide or a mixture of catalytic metals such as platinum and iridium in a binding matrix.

Generally speaking the recommended methods of cleaning calcium deposits from cathodes is to gently brush the surface of the cathode with a stiff nylon bristled brush and/or to immerse the cathode in an acid (usually hydrochloric acid) solution. Both cleaning methods are quite destructive of the delicate catalyst coating and lead to a rapid degeneration of the cathode efficiency.

Typically, an electrode assembly of a "convection" chlorinator may require replacement say every twelve to eighteen months whereas as electrode assembly of an "in-line" chlorinator may require replacement as frequently as three to six months due to its unduly harsh operating environment. As the cost of such electrode assemblies is usually of the order of several hundreds of dollars, the replacement cost of electrodes, including labour costs, places an unacceptable burden on owners of such electrolytic chlorinators.

It is an aim of the present invention to provide a self cleaning electrode assembly for electrolytic chlorinators.

It is a further aim of the invention to provide a novel swimming pool skimmer box assembly embodying a convection chlorinator.

It is yet a further aim of the invention to provide a floating chlorinator independent of electrical mains power sources.

According to a first aspect of the invention there is provided a power supply system for an electrolysis apparatus, said power supply system comprising;

means for connection to a source of electrical energy;

cathode connection means for connecting an output of said power supply system to a cathode of an electrolysis apparatus;

anode connection means for connecting an output of said power supply system to an anode of said electrolysis apparatus;

potential control means for applying a controlled electrical potential between said anode connection means and said cathode connection means; and, reversing means for reversing the polarity of said electrical potential when applied between said anode connection means and said cathode connection means, said reversing means including timer means to control a duty cycle of potential applied between said anode and cathode connection means, stepping means to selectively reduce said controlled electrical potential from a maximum value to a minimum value prior to reversing the polarity of said applied potential, and stepping means to selectively increase said controlled electrical potential from a minimum value to a maximum value after reversal of the polarity of said applied electrical potential.

Preferably said potential control means is adapted to provide a direct current electrical potential between said anode and cathode connection means. Said direct current potential may comprise a half wave rectified power output or alternatively said direct current may comprise a full waver rectified power output.

Preferably said direct current potential comprises a selectively operable combination of half wave and full wave rectified power output.

Said reversing means may be selected from mechanical, electromechanic or electronic switching means, preferably electronic switching means.

Said timer means may include any suitable timing means to selectively control the duration of said duty cycle.

Said stepping means may comprise any suitable means to vary the magnitude of said potential applied between said anode and cathode connection means between a maximum and minimum value.

Said stepping means may comprise means to vary the magnitude of said applied potential through a predetermined number of steps of predetermined magnitude and/or duration.

Alternatively, said stepping means may comprise means to vary the magnitude of said applied potential between a maximum value and a minimum value in a continuous manner at a predetermined rate of change between said maximum and minimum value.

According to a further aspect of the invention there is provided a self cleaning electrolytic chlroinator comprising:

a power supply system according to said first aspect of the invention;

a hollow housing having an inlet port and an outlet port;

an electrode assembly comprising two or more spaced electrode members, said electrode members being located in a liquid flow path between said inlet port and said outlet port, each of said two or more electrode members being electrically connectable to a respective one of said cathode and anode connection means.

Suitably said housing is associated with an in-line electrolytic chlorinator.

Preferably said housing is associated with a convection chlorinator.

If required said two or more electrode members are comprised of substantially identical materials.

Preferably said two or more electrode members comprise an electrocatalytic coating.

According to another aspect of the invention there is provided a swimming pool skimmer weir box assembly, said skimmer weir box assembly comprising:

a hollow body having a removable top cover, a liquid outlet port adjacent a lower portion of said hollow body and in fluid communication with the interior of said hollow body;

a liquid inlet port adjacent an upper portion of said hollow body and in fluid communication with the interior of said hollow body, a weir baffle located within said inlet port, said weir baffle being pivotally mounted to said skimmer weir box assembly adjacent a lower edge of said weir baffle, said weir baffle including flotation means adjacent an upper edge thereof; and, associated with said skimmer box assembly, an electrolytic convection chlorinating apparatus comprising a hollow upright electrode chamber, said electrode chamber being open at an upper end thereof;

a liquid inlet passage adjacent a lower end of said electrode chamber and in fluid communication with the interior thereof;

a liquid outlet passage intermediate said liquid inlet passage and said upper end of said electrode chamber, said liquid outlet passage having an opening adjacent a lower portion of said inlet port associated with said skimmer weir box assembly, said liquid inlet passage, said liquid outlet passage and said liquid inlet port of said skimmer weir box assembly each being adapted for attachement to an inner wall surface of a swimming pool structure.

Suitably said skimmer weir box assembly includes an electrode assembly removably locatable within said electrode chamber.

Preferably said skimmer weir box assembly includes a controllable power system to control in use a potential difference applicable between opposing electrodes and or electrical current in an electrolyte between said electrodes.

Most preferably said skimmer weir box assembly includes a controllable power system according to the first aspect of the invention.

Suitably said electrolytic convection chlorinating apparatus is attached to said skimmer weir box assembly.

Preferably said electrode chamber, said liquid inlet passage and said liquid outlet passage are formed integrally with said skimmer weir box assembly.

According to yet another aspect of the invention there is provided an electrolytic chlorinator for swimming pools or like bodies of stored water, said electrolytic chlorinator comprising:

an upright hollow electrode chamber having gas venting means adjacent an upper end thereof and a liquid inlet port adjacent a lower end thereof and in fluid communication with said electrode chamber, said electrode chamber including a liquid outlet port intermediate an upper end of said chamber and said inlet port, said outlet port being in fluid communication with the interior of said chamber;

flotation means associated with said electrode chamber intermediate said gas venting means and said outlet port;

electrode means removably locatable within said electrode chamber;

a controllable power system for supplying electrical power to said electrodes, said power system including an array of photovoltaic cells.

Suitably said power system is sealed against ingress of corrosive fluids.

Preferably said power system comprises a controllable power system according to the first aspect of the invention.

As used herein the expression "in-line" electrolytic chlorinator means a chlorinator of the type which is plumbed into a water circulation circuit wherein fluid flow is under the influence of a rotary pump or the like.

"Convection" chlorinator means a chlorinator through which electrolyte flows by a convection current induced only by generation of gas bubbles at the surface of an electrode assembly.

In order that the invention may be more readily understood, reference is made to various preferred embodiments of different aspects of the invention illustrated in the accompanying drawings in which;

FIG. 1 shows a schematic block diagram of a control circuit for an electrode in a chlorinator. The circuit is capable of supplying DC power which increases to a maximum positive level, decreases to zero, increases to a maximum negative value and then returns to zero and cycles through this sequence in a preselected timing period of 4, 8, 16, 24 or 48 hours or other periods.

The change in DC power level may be substantially continuous or smooth. In one embodiment a ramped change is effected. Alternatively a step wise change may be effected. Where either continuous or stepped changes in output are effected the controller 1 may function to control the phase angle of conduction of controllable switches or rectifiers SW1, SW2 to control the amount of time each or both switches are conducting and also to control the direction of conduction of these devices. The controller 1 may conveniently be a pulse width modulator or other suitable switching controller. The timer 2 functions to provide the periods of operation referred to above.

The converter 3, together with switches SW1, SW2 function as a DC to DC converter. Converter 3 may include a transformer. The transformer preferably has a centre tapped primary winding. The DC output may be available between that centre tap and a junction between switches SW1, SW2 (not shown). The switches are each preferably one or more controllable conducting devices. Preferably the switches each comprise a triac with the gate of each being coupled to the controller 1 to enable the controller to not only control the conduction phase angle but the direction of conduction of the triaos for DC reversal.

Figure 2:
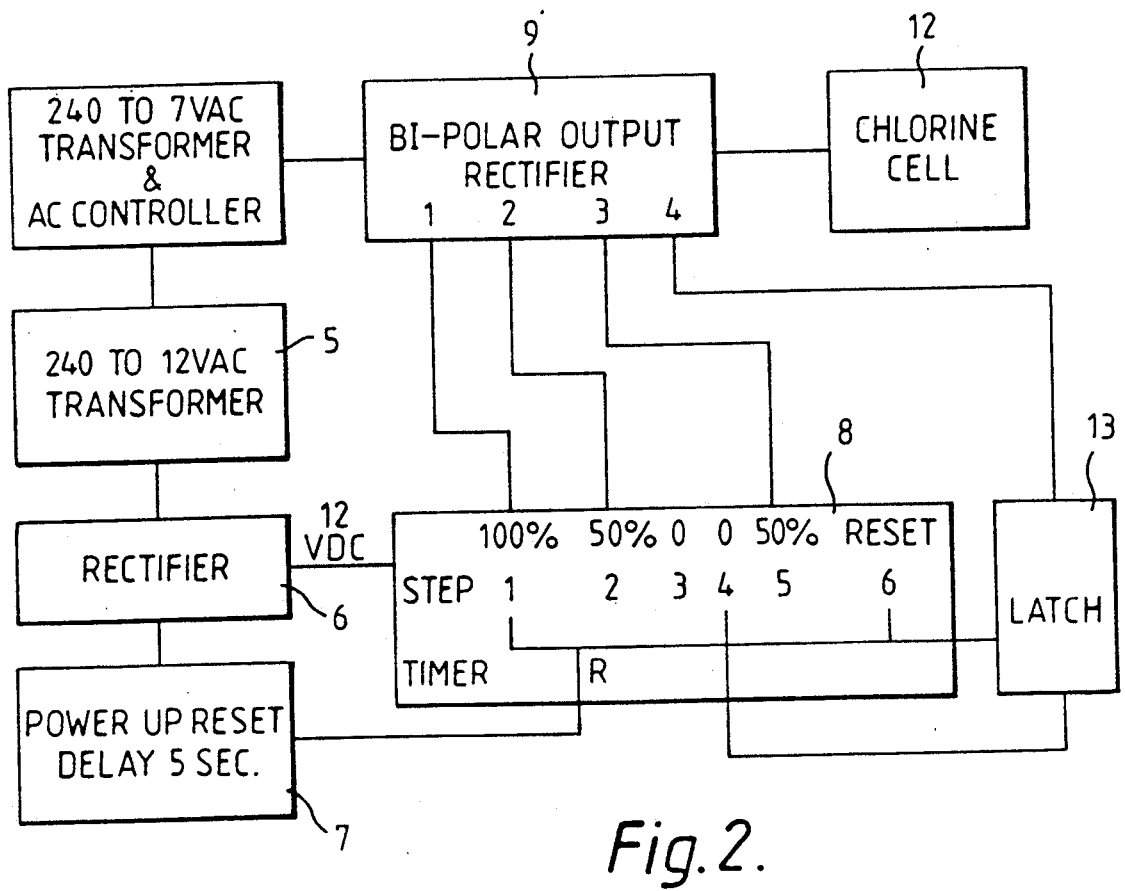
FIG. 2 shows an alternative embodiment of the arrangement of FIG. 1.

FIG. 2 shows an alternative block diagram. In FIG. 2 supply is derived from the mains and transformer 5 together with rectifier 6 provide DC power for the remainder of the circuit. Block 7 is indicative of a timer which provides a delay at switch on to ensure that the circuit is initialised before its proper function commences. The block 7 also provides a reset signal for stepping circuit 8 and controls the period of operation of circuit 8.

A bipolar controlled rectifier 9 receives step signals from circuit 8 and in response to those signals functions as a DC converter and is operative to provide a stepped DC output to cell 12. This output varies from 0, 50% 100% 50% 0, −50% −100%, −50% to 0 DC output in a sequential and repetitive fashion. The reversal of polarity is achieved by latch 13.

Figure 3A:
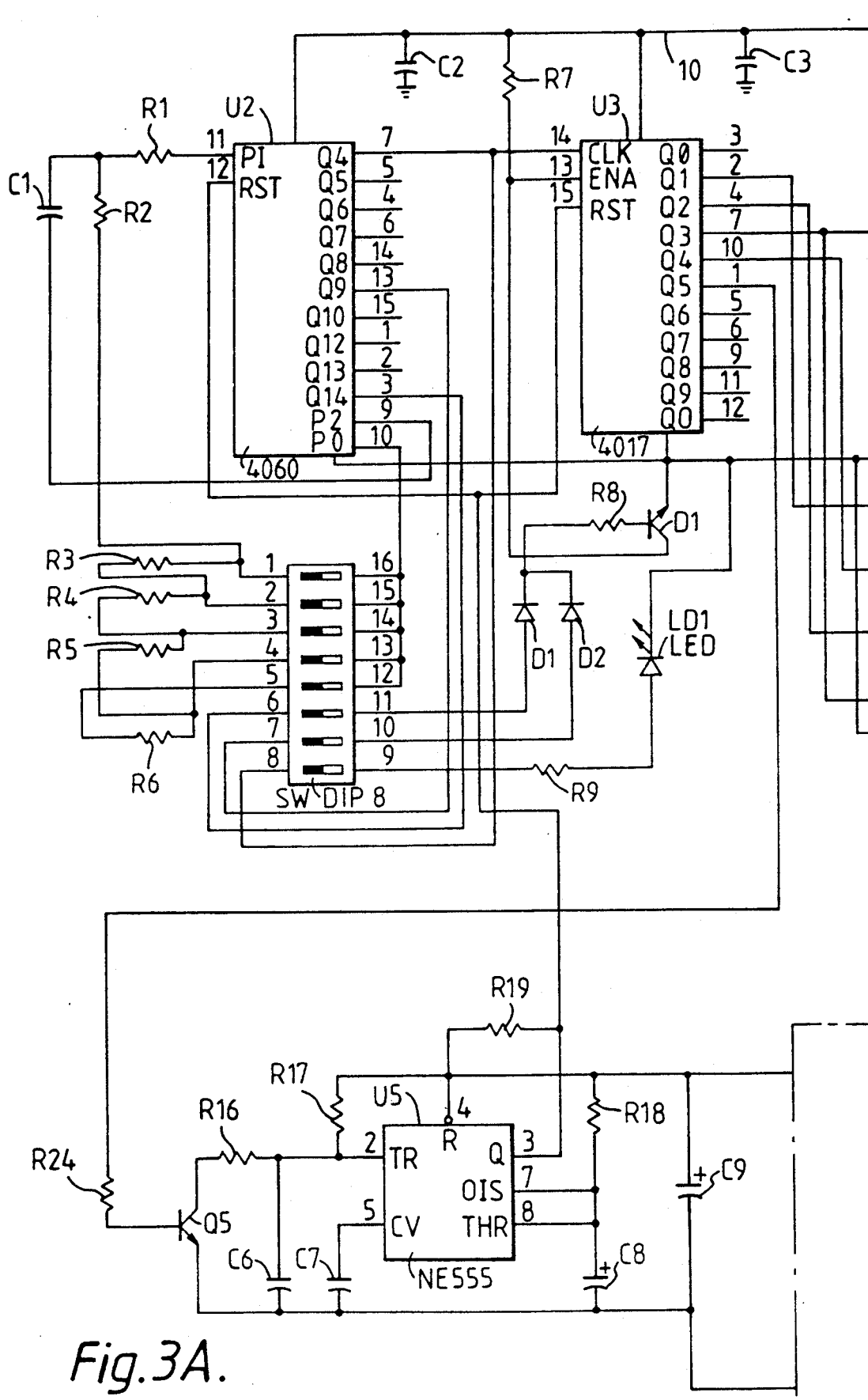
FIG. 3 shows a detailed circuit diagram suitable for a convection chlorinator.
Figure 3B:
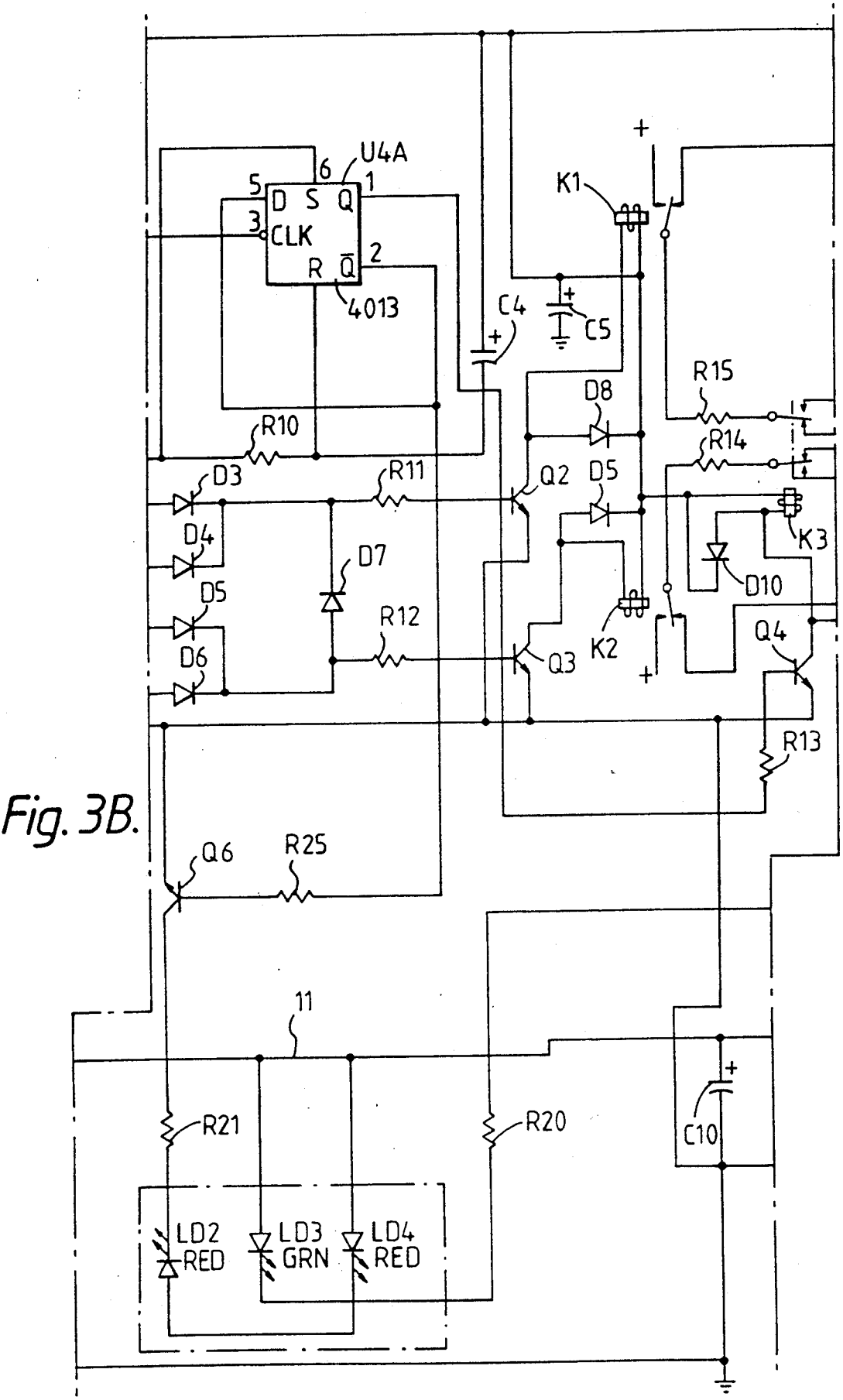
Figure 3C:
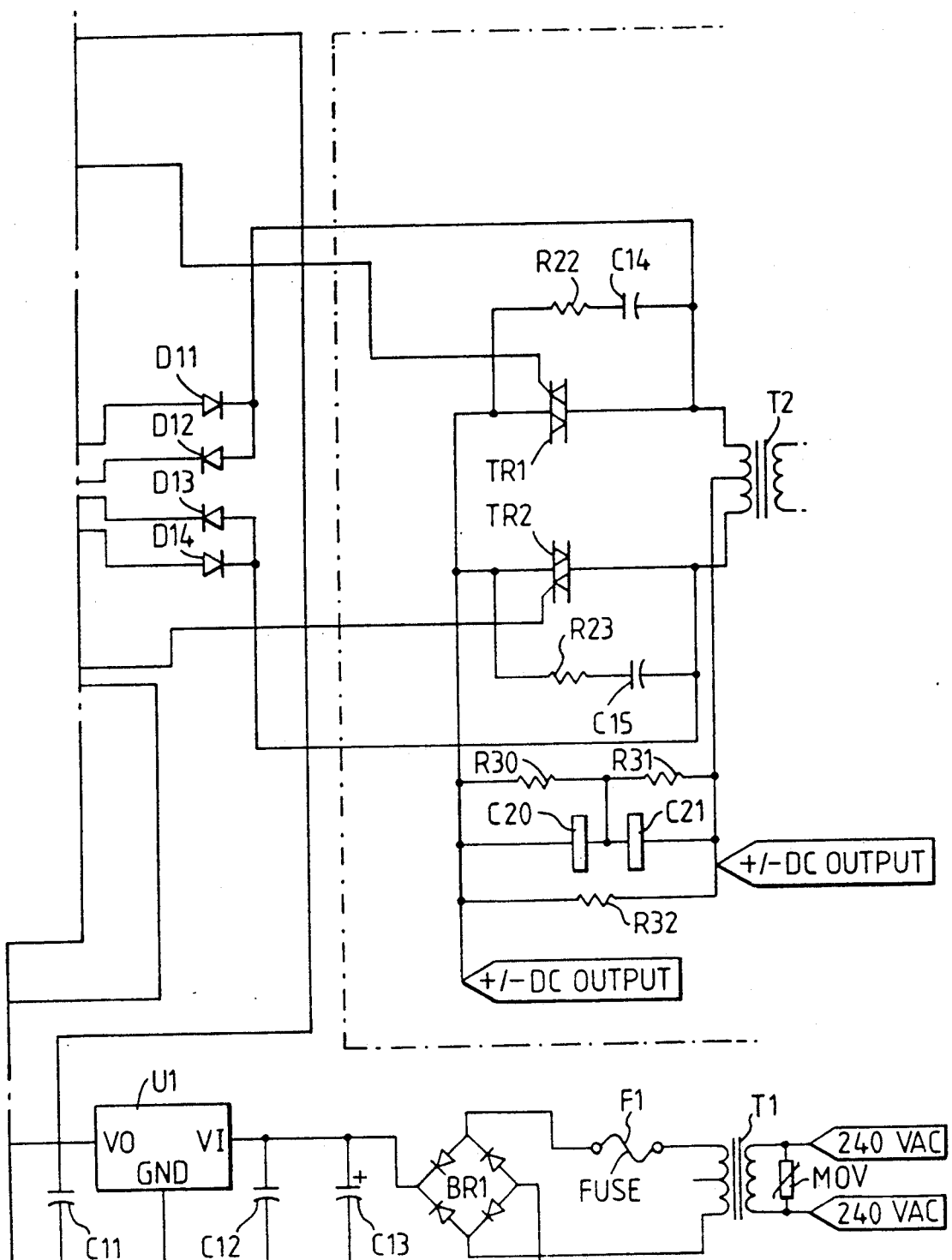

FIG. 3 illustrates a detailed circuit diagram of one embodiment of the invention. In this figure AC power is supplied to the primary winding of transformer T1. A surge suppressor MOV is connected across this winding and a stepped down voltage is available across the secondary of the transformer T1. A fuse F1 is in series with the secondary winding. Bridge rectifier provides a full wave rectified output which is filtered by capacitors C12 and C13 before being coupled to regulator U1. Regulator U1 provides a regulated power supply for the remainder of the circuit. The output from U1 undergoes further filtering by capacitors C10, C11. The regulated supply is made available to devices U6, U2, U3, U4A and is supplied to these devices by rails 10, 11. Various other components of the circuit derive power from these rails.

Device U5 is an NE555 timer configured to provide an output at pin 3. When the circuit is first energized, pin 3 is high for a predetermined period of time, typically 2 seconds, controlled by timing component C7. When the period is timed out pin 3 goes low. A low signal at pin 3 resets devices U2 and U3. This reset signal is supplied to pins 12 and 15 of devices U2 and U3 respectively.

Device U2 is a 4060 counter and has power supplied to it via rail 10. Capacitors C2, C3 function as filter components. Pins Q4 to Q14 of device U2 are outputs from the counter and only pins Q4, Q9 and Q14 are used. Timing components C1 and R2 to R6 are coupled to device U2 to control the frequency of its operation. Resistors R3 to R6 may be selected to combine with resistor R2 to give a timing period of 8, 16, 24 and 48 hours or provide a test timing period of 2 minutes. Capacitor C4 provides a reset for devices U2, U3 at switch on of the circuit. Timing resistors R3 to R6 are coupled to DIP switch package DIP8 to enable these resistors to be combined with timing capacitor C1 to provide the various timing periods at which U2 operates.

The output from pin Q4 of U2 is supplied to the clock input of by 10 divider U3. Device U3 may be a 4017 divider. Resistor R7 is a pull up resistor coupled to the enable input of U3. When pin Q14 is high transistor Q1 is switched to provide an enable signal for U3. U3 has outputs Q0 to Q9 only outputs Q1 to Q5 of which are used.

D type flip flop U4A receives at its clock input pin 3 the output at Q3 of U3. A set signal is obtained for U4A from capacitor C4 which is coupled to rail 10. The outputs Q and Q from flip flop U4A are used to switch transistor Q4 and to energize LED LDZ respectively.

Diode matrix D3 to D7 is coupled to outputs of U3 and controls the supply of signals to transistors Q2, Q3. Resistors R8, R11, R12, R13, R24 and R25 are current limit resistors for the current supplied to the base of transistors Q1, Q2, Q3, Q4, Q5 and Q6 respectively.

Transistor Q4 has the Q output from U4A supplied to its base and when the Q output is high the transistor switches to energize relay coil K3. Coil K3 has two sets of contacts are in the position shown when the coil K3 is de-energized. Diode D10 is a back emf protection diode for transistor Q4.

Relay K1 has one set of contacts associated with it and is energized by transistor Q2 when a high signal is applied to the base of Q2 via diode D3, D4 or through series connected diodes D5 and D7 or D6 and D7. Protection diode D8 is connected across coil K1.

Relay K2 has one set of contacts associated with it and is energized by transistor Q3 when a high signal is applied to the base of Q3 via diode D5 or D6. Protection diode D9 is connected across coil K2.

The contacts associated with K1 are effective to couple a gate signal to triac TR1 and this signal is either positive or negative depending upon the phasing of the primary winding of transformer T2. This signal is coupled to the gate of TR1 via either diode D11 or D12 depending upon the position of the contacts associated with K3 and K1.

Similarly the gate of triac TR2 has a positive or negative signal coupled to it via diodes D13 or D14 depending upon the phasing of the secondary of transformer T2 and on the position of the contacts of relay K3 and K2.

Series connected resistor and capacitor R22, C14 are protection components which prevent triac TR1 from oscillating. Resistor R23 and capacitor C15 perform a similar protection function for triac TR2.

The DC output produced by the triac 1 transformer combination is available across the transformer primary centre tap and the junction between triacs TR1/TR2. Filter components consisting of electrolytic capacitors C20, C21 are coupled across the junction and centre tap. Bleed resistors R30, R31 bridge between the junction and the capacitors and between the centre tap and the capacitors respectively. Resistor R32 functions as a load or current limit resistor.

Various LED indicators are present to enable the operation of the circuit to be monitored. LED LD1 is energized whenever the output Q4 of U2 is high.

LED's LD2 and LD4 are in series and are energized upon the switching of transistor Q6 which occurs when the Q output of flip flop U4A is high and hence a positive DC output is obtained from the circuit. When the Q output of flip flop U4A is high LED LD3 will become energized and this is indicative of a negative DC output being provided by the circuit.

The operation of the circuit of FIG. 3 is as follows. When AC power is first supplied to T1 the regulator circuit associated with T1 provides a regulated DC output for controlling the remainder of the circuit. At switch on a reset pulse for U2 and U3 and U4A is obtained through C4. Pin 3 of timer U6 is high for about 2 seconds—this inhibits U2. At the end of this period pin 3 of U6 goes low and when a high level signal is applied to the base of transistor Q5 the trigger input TR of U6 goes low and the timer provides a low output. The counter U2 commences to count and binary outputs are available at output Q4 of U2. These outputs are supplied to divider U3. When Q14 of U2 goes high either the output from Q9 or Q14 may be used (through DIP switches DIP8) to reset both the counter and the divider. When in the test mode the output at Q4 of U2 may (through DIP8) be used for resetting.

The divider has outputs Q1 to Q5 in use. Outputs Q1, Q2, Q3 and Q4 are applied to the diode matrix consisting of diodes D3 to D7 whilst output Q3 is applied to toggle D type flip flop U4A.

Relays K1 and K2 are controlled by U3 to initially trigger TR1, TR2 to provide a zero DC output for the circuit. Then only one of TR1 and TR1 is triggered to provide a half wave rectified and hence 50% of maximum DC output for the circuit. Then both TR1, TR2 are triggered and a full way rectified output is supplied and hence 100% of maximum DC output for the circuit. Then the other of TR1, TR2 is triggered to provide 50% output. Then both TR1, TR2 are not triggered and no DC output is supplied. Coil K3 is then energized by switching transistor Q4 via output Q from U4A. This then enables TR1, TR2 when triggered to conduct in the opposite direction to that previously such that when one of TR1, TR2 is triggered the circuit provides a negative 50% DC output. Then when both TR1, TR2 are triggered a negative 100% DC output is supplied. Then a negative 50% DC output followed by a zero output and then the cycle repeats. At the last step function transistor Q5 resets the circuit so that the sequence may recommence.

The power supplied to the cell by the circuit may be 5 A, 7 V or any other suitable supply. Preferably the power is variable and may be altered or changed to suit. The input for the circuit, whilst shown in this embodiment, to be obtained from the mains, may be obtained from other suitable sources. For example an array of solar cells may be employed.

It has been found in practice that switching of the polarity of electrolytic chlorinators under normal operating power loads causes a rapid deterioration in electrode efficiency. This deterioration is believed to arise from electrical "shock" which causes the fragile electrocatalytic coating to crack and flake off under such shock loads. This problem is particularly noticeable with in-line chlorinators which typically operate at voltages of 25-32 volts and a current density of 25-30 amps/dm$^2$. Although the polarity of in-line chlorinators may be switched between operating cycles to minimise electrical shock loads, it is considered that the shock loads associated simply with power on and power off switching are too great to maintain economical longevity in electrode assemblies.

By utilizing the controllable power supply according to the first aspect of the invention to gradually increase power from a minimum to a maximum during the power on phase and vice versa during the power off phase, electrical shock loads are substantially alleviated.

Although convection chlorinators operate typically with a voltage of 3.5-1 volts and a current density in the range 2.5-5.0 amps/dm$^2$, it has been found that the longevity of electrocatalytically coated electrodes may be increased by a factor of between 3 and 4.

Figure 4:
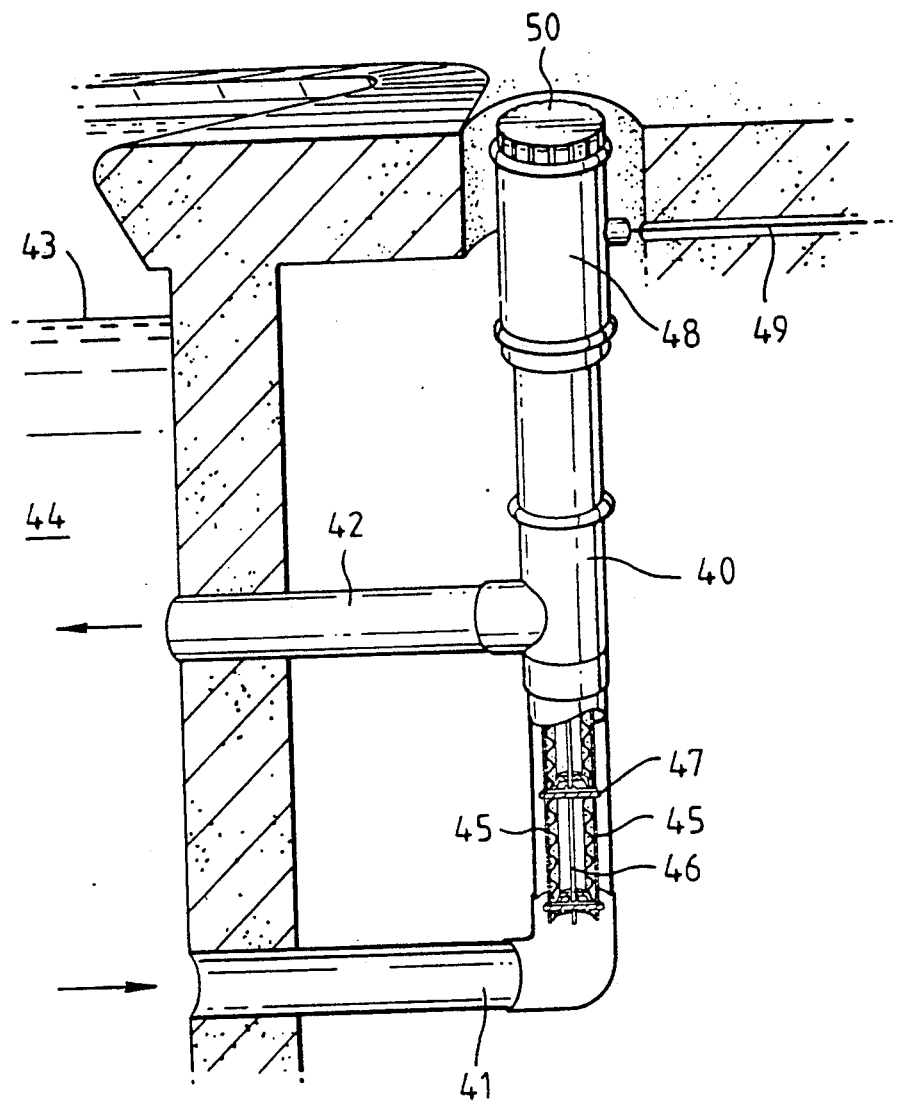
FIG. 4 shows one form of convection chlorinator.

FIG. 4 shows a prior art convection chlorinator, the subject of Australian Patent No. 569,026 to the assignee of this invention.

The apparatus comprises a hollow electrode compartment 40 having an inlet port 41 and an outlet port 42, both of which are located below the level 43 of the water within swimming pool 44. Located within compartment 40 is an electrode assembly comprising a pair of anodes 45 of expanded titanium mesh and a cathode 46 of expanded titanium mesh coated with an electrocatalytic coating. The anodes and cathode are maintained in a desired spacial separation by insulating locating spacers 47. The electrodes extend from a region adjacent the inlet port 42 to a region adjacent outlet port 42.

Located within the upper portion 48 is an insulating arm (not shown) connected to the electrode assembly. An electrical cable 49 connected to a controlled electrical power supply (not shown) is connected through the insulating arm to terminals (not shown) on the electrode assembly.

A gas venting cap 50 is provided on the upper end of compartment 40 to permit escape of gases accumulating in the upper part of compartment 40.

The swimming pool water typically contains sodium chloride at a concentration between 0.5%-1.5% w/v.

In use, with a potential difference of, say, 3.5 volts applied between the cathodes and anode, chlorine gas is liberated at the anode surface and the small gas bubbles so produced rise upwardly through the electrolyte in the anode compartment 40. As the cell is operated under polarizing conditions, oxygen is also liberated from the anode surface while hydrogen is produced at the cathode surfaces. The chlorine and oxygen bubbles tend to be quite small compared with the hydrogen bubbles.

As the bubbles of hydrogen oxygen and chlorine stream from the surface of the electrodes within the confined space of compartment 40 the density of liquid near the outlet port 42 of the electrodes is significantly less than that near the inlet port 41. As the head of water in compartment 40 above outlet port 42 is vented to atmosphere, a pressure gradient is created between the liquid in inlet port 41 and outlet port 42 such that water flows from within pool 44 into inlet 41, over the electrodes and back into the pool via outlet 42. The flow of water so produced carries the relatively small (and less mobile) bubbles of oxygen and chlorine into the swimming pool where the chlorine gas dissolves to form predominantly soluble hypochlorite cations. The relatively more mobile hydrogen bubbles tend to pass into the upper portion 48 of compartment 40 and are safely vented to atmosphere via cap 50.

Generally speaking it has been found that as the height of the relatively static head of water is increased above outlet port 42, the convection flow between inlet port 41 and outlet port 42 becomes more efficient with less chlorine gas escaping via vent cap 50. The electrode assembly of this apparatus is readily removable for periodic scale removal but preferably it is operated in combination with the polarity switching power supply according to the first aspect of the invention, thereby avoiding the necessity for cleaning of the electrodes.

Figure 5:
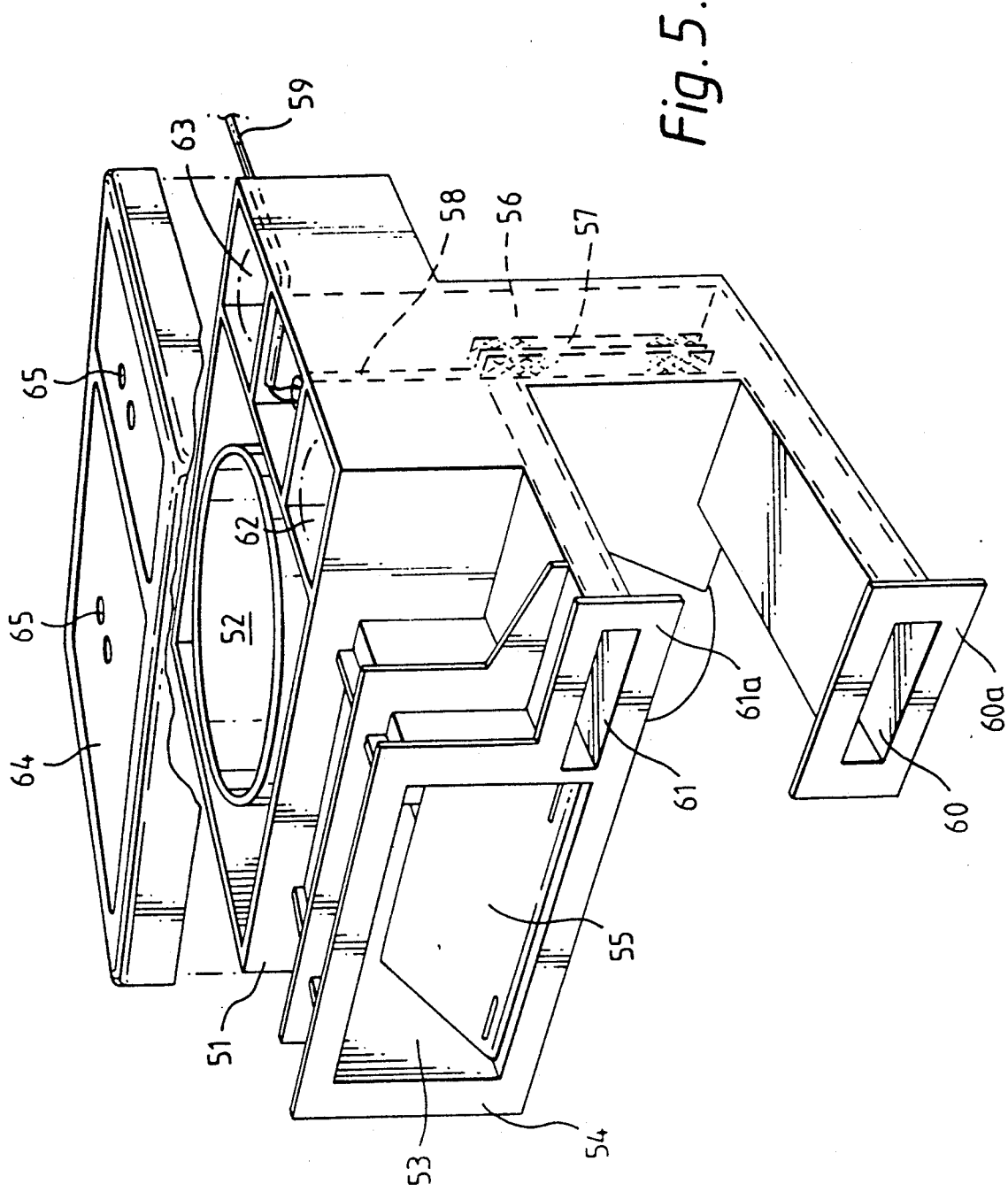
FIG. 5 shows another form of convection chlorinator.

FIG. 5 shows a further aspect of the invention in a preferred embodiment of a novel combination of a conventional swimming pool skimmer weir box and a convection chlorinator.

In FIG. 5 a skimmer weir box 51 comprises a hollow compartment 52 in which is usually located a perforated leaf collecting basket (not shown). In the lower part of compartment 52 is an outlet port (not shown) for connection to a conduit leading to a swimming pool filtration system (also not shown).

Communicating with the interior of compartment 51 is an inlet port 53 projecting outwardly from compartment 51 for incorporation into the wall of a swimming pool with flange 54 located flush with the exposed surface of the swimming pool wall. A weir baffle 55 is pivoted at its lower edge to the lower inner surface of inlet port 53.

Formed integrally with the body of skimmer weir box 51 is a hollow electrode compartment 56 containing an electrode assembly 57 mounted on an insulating arm 58. An electrical cable 59 is connected at one end to the electrode assembly 57 and at the other end to a controllable power supply (not shown).

Extending from the lower end of compartment 56 and in fluid communication therewith is an inlet port 60. An outlet port 61 is also in fluid communication with the interior of compartment 56. Inlet and outlet ports 60, 61 respectively include trim flanges 60a, 61a in the same plane as flange 54 to facilitate fluid tight mounting flush with the exposed surface of a swimming pool wall.

Located adjacent compartment 56 are further compartments 62, 63 for storage of a swimming pool test kit, swimming chemicals such as acid for pH adjustment or the like, electrode cleaning solutions etc.

A cover plate 64 includes pairs of spaced apertures 65 to facilitate removal of the cover plate 64 and to permit venting of gases accumulating in electrode compartment 50.

In use the electrolytic convection chlorinator system operates in substantially the same fashion as that illustrated in FIG. 4. Preferably however, the electrolytic chlorinator/skimmer weir box combination of FIG. 5 is operated with a controllable reversible polarity power supply system to provide a substantially maintenance free operation.

The apparatus illustrated in FIG. 5 is suitably formed by injection moulding from a suitable plastics material such as polystyrene, A. B. S., polypropylene etc. When formed as an integral unit substantial unit cost savings may be obtained as well as substantial labour savings in installation.

Of particular importance however is the improved efficiency in operation of the electrolytic chlorination apparatus.

Prior art electrolytic convection chlorinators are operated entirely independently of the swimming pool filtration system and as such usually operate continuously. The main disadvantage is that while the swimming pool filtration system is not in operation, the highly chlorinated water issuing from the chlorinator is not being circulated evenly throughout the pool. Accordingly, the region surrounding the chlorinator outlet develops a high chlorine concentration which not only takes a lengthy time to dissipate through the body of swimming pool water, but also retards to some extent the rate of dissolution of freshly produced chlorine gas bubbles in the surrounding water.

By positioning the outlet of the chlorinator adjacent the inlet of the skimmer weir box, water containing chlorine gas bubbles is drawn through the weir and is circulated via the filtration system to remote parts of the swimming pool. The circulation through the filtration circuit under normal pump pressures greatly enhances the rate of chlorine dissolution. With regular spaced filtration cycles of say 2×4 hours or 3×2 hours, the chlorine level in a swimming pool may be maintained at a relatively low level of say 1.5 to 3.0 ppm, which if kept consistent is sufficinet for swimming pool sanitization. Prior art electrolytic chlorinators which cause chlorine concentrations to vary widely on a daily cycle between, say, 10 ppm to a value less than 1 ppm are ineffective in controlling algae and certain types of bacteria.

In other variations of this aspect of the invention there may be proved a conventional skimmer weir box assembly to which a convection chlorinator of the type illustrated in FIG. 4 may be attached by adhesives or mechanical fastening means. A flange adaptor plate may be employed to align the ports.

Figure 6:
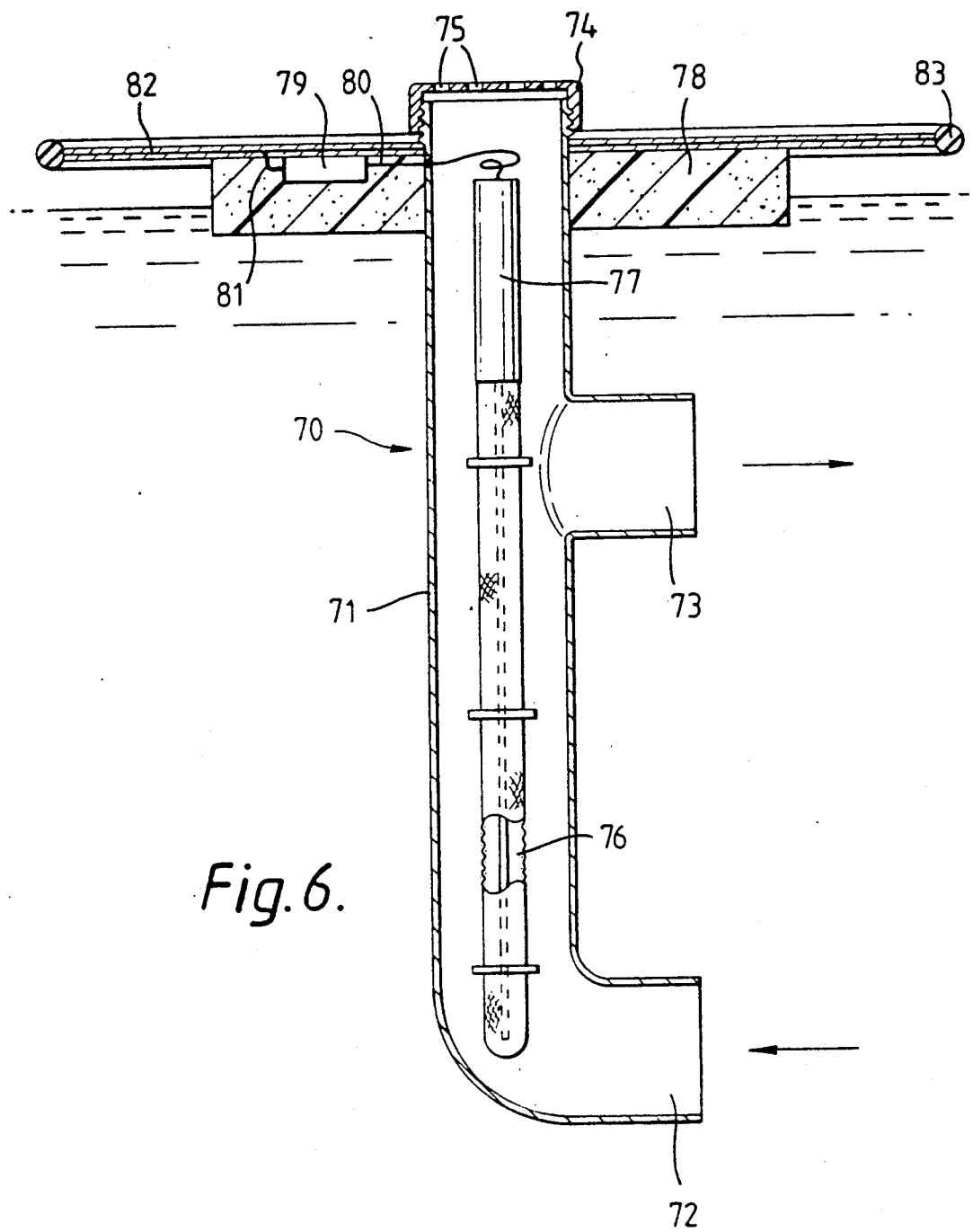
FIG. 6 shows a floating, color powered convection chlorinator.

FIG. 6 illustrates a particularly useful form of the invention.

The chlorinator 70 comprises an upright hollow body 71 having an inlet port 72 at its lower end and an outlet port 73 spaced above the inlet port 72.

Located at the upper end of body 71 is a screw threaded cap 74 having gas venting apertures 75 located therein. An electrode assembly 76 having an insulated arm 77 is located within body 71.

Figure 1:
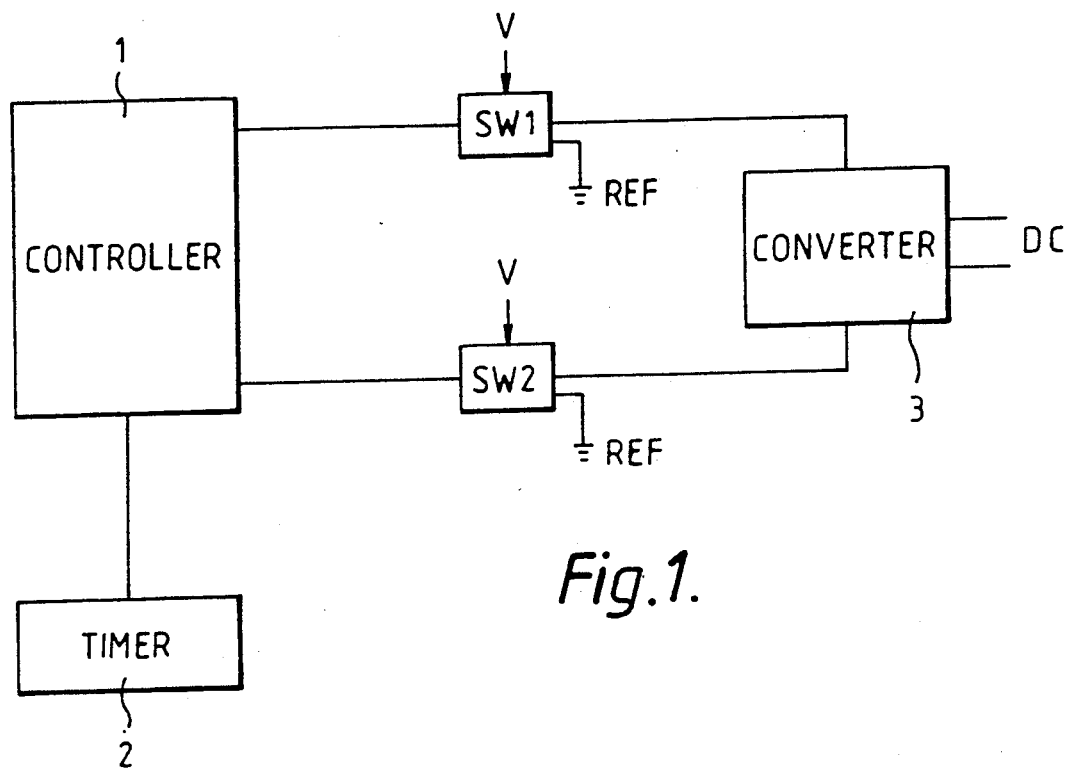
FIG. 1 shows a schematic block diagram of a reversible polarity control circuit for both in-line and convection chlorinators.

Adjacent the upper end of body 71 is a flotation member 78, suitably a hollow member filled with air or a cellular plastics material. Within the interior of flotation member 78 is a controllable power supply system 79 of the type generally described with reference to FIGS. 1-3.

Preferably the power supply system 79 is in the form of an integrated circuit encapsulated in a water proofing medium such as epoxy resin, polyester resin, silicone resin or the like.

The power output of power supply system 79 is connected via an electrical cable 80 to terminals (not shown) on the electrode assembly. The power input of supply system 79 is obtained via cable 81 from an array of photovoltaic cells 82 encapsulated between sheets of clear plastic material such as polycarbonate or acrylic plastics. Mounted about the periphery of photovoltaic cell array 82 is a cushioning buffer 83 of resilient plastics or rubber material.

The low power requirements of a convention type chlorinator permit the use of photovoltaic arrays in an apparatus which is independent of an external source of power. An apparatus of this type provides an economical maintenance free chlorinator for existing swimming pool structures where mechanical and/or electrical installation of an apparatus of the type shown in FIG. 4 or FIG. 5 is precluded.

The apparatus of FIG. 6 is particularly useful in maintenance of a swimming pool whilst the pool owner is absent on holiday or the like. As the apparatus is independent of an external power source, the swimming pool filtration system may be electrically isolated for safety reasons during the pool owner's absence. As the apparatus is free to move about the surface of the water in a swimming pool due to wind action, a reasonably even distribution of chlorine may be achieved. As the bulk density of the gas containing liquid issuing from the outlet port is less than that of the liquid entering the inlet port, the effective volume of liquid issuing from the outlet port is somewhat greater and the resultant effect is a gentle thrust applied to the apparatus to assist its motion about the water surface.

To boost the performance of the apparatus, a compact, high capacity storage battery may be located within flotation chamber 78 to extend the duty cycle of the apparatus beyond daylight hours.

An advantage of this embodiment of the invention is that it may be inexpensively purchased from a department store in an assembled state and simply placed in a swimming pool by an owner, thus avoiding installation costs of other types of systems.

In other forms of this aspect of the invention, the body of the electrolytic chlorinator 70 may be attached to a swimming pool wall or suspended from a swimming pool coping edge with electrical connection to a photovoltaic cell array located at a remote position.

It is be clear to a skilled addresses that many modifications, adaptions and variations may be made to the various aspects of the inventions disclosed herein without departing from the spirit and scope thereof.

Furthermore, a skilled addresses will readily appreciate that various aspects of the inventions disclosed herein will be applicable to existing prior art electrolytic chlorinators to improve the performance and reliability thereof whilst various novel combinations disclosed herein represent significant advances in the art of electrolytic chlorinators.

What is claimed is:

1. A power supply system for an electrolysis apparatus, said power supply system comprising:
   (i) means for connection to a source of electrical energy;
   (ii) cathode connection means for connecting an output of said power supply system to a cathode of an electrolysis apparatus;
   (iii) anode connection means for connecting an output of said power supply system to an anode of said electrolysis apparatus;
   (iv) voltage control means for applying a controlled electrical potential between said anode connection means and said cathode connection means; and
   (v) reversing means for reversing the polarity of said electrical potential when applied between said anode connection means and said cathode connection means, said reversing means including timer means to control a duty cycle of potential applied between said anode and cathode connection means, stepping means to selectively reduce said controlled electrical potential from a maximum value to at least one intermediate value before reaching a minimum value prior to reversing the polarity of said applied potential, and stepping means to selectively increase said controlled electrical potential from a minimum value to at least one intermediate value before reaching a maximum value after reversal of the polarity of said applied electrical potential.

2. A system as claimed in claim 1 wherein said potential control means is adapted to provide a direct current electrical potential between said anode and cathode connection means.

3. A system as claimed in claim 2 wherein said direct current potential comprises a half wave rectified power output.

4. A system as claimed in claim 2 wherein said direct current potential comprises a full wave rectified power output.

5. A system as claimed in claim 2 wherein said direct current potential comprises a selectively operable combination of half wave and full wave rectified power output.

6. A system as claimed in claim 1 wherein said stepping means is adapted to vary the magnitude of said potential applied between said anode and cathode connection means between a maximum and minimum value.

7. A system as claimed in claim 6 wherein said stepping means is adapted to vary the magnitude of said applied potential through a predetermined number of steps of predetermined magnitude and/or duration.

8. A system as claimed in claim 6 wherein said stepping means is adapted to vary the magnitude of said applied potential between a maximum value and a minimum value in a substantially continuous manner at a predetermined rate of change.

9. A self-cleaning electrolytic chlorinator comprising:
   (i) means for connection to a source of electrical energy;
   (ii) cathode connection means for connecting an output of a power supply system to a cathode of an electrolysis apparatus;
   (iii) anode connection means for connecting an output of said power supply system to an anode of said electrolysis apparatus;
   (iv) voltage control means for applying a controlled electrical potential between said anode connection means and said cathode connection means;
   (v) reversing means for reversing the polarity of said electrical potential when applied between said anode connection means and said cathode connection means, said reversing means including timer means to control a duty cycle of potential applied between said anode and cathode connection means, stepping means to selectively reduce said controlled electrical potential from a maximum value to at least one intermediate value before reaching a minimum value prior to reversing the polarity of said applied potential, and stepping means to selectively increase said controlled electrical potential from a minimum value to at least one intermediate value before reaching a maximum value after reversal of the polarity of said applied electrical potential;
   (vi) a hollow housing having an inlet port and an outlet port; and
   (vii) an electrode assembly comprising two or more spaced electrode members, said electrode assembly being located in said housing in a liquid flow path between said inlet port and said outlet port, each of said two or more electrode members being electrically connectable to a respective one of said cathode and anode connection means.

10. A chlorinator as claimed in claim 9 wherein, in use, liquid flow over said electrode assembly is effected by electro-mechanical pump means.

11. A cholorinator as claimed in claim 9 wherein, in use, liquid flow over said electrode assembly is effected by a connection current generated by liberation of electrolysis gases at the electrode assembly.

12. A swimming pool skimmer weir box/electrolytic chlorinator assembly comprising:
   (i) a hollow body having a removable top cover, a liquid outlet port adjacent a lower portion of said hollow body and in fluid communication with the interior of said hollow body, a liquid inlet port adjacent an upper portion of said hollow body and in fluid communication with the interior of said hollow body, a weir baffle located within said inlet port, said weir baffle being pivotally mounted to said skimmer weir box assembly adjacent a lower edge of said weir baffle, said weir baffle including flotation means adjacent an upper edge thereof;
   (ii) a hollow upright electrode chamber having an inlet passage adjacent a lower end thereof and an opening at an upper end thereof, said electrode chamber having a liquid outlet passage located intermediate said inlet passage and said opening at an upper end thereof, said liquid outlet passage having an opening adjacent a lower portion of said inlet port of said skimmer weir box assembly;
   (iii) an electrode assembly removably located within said electrode chamber; and
   (iv) a power supply system including
      (a) means for connection to a source of electrical energy;
      (b) cathode connection means for connecting an output of said power supply system to a cathode of an electrolysis apparatus;
      (c) anode connection means for connecting an output of said power supply system to an anode of said electrolysis apparatus;
      (d) voltage control means for applying a controlled electrical potential between said anode connection means and said cathode connection means; and
      (e) reversing means for reversing the polarity of said electrical potential when applied between said anode connection means and said cathode connection means, said reversing means including timer means to control a duty cycle of potential applied between said anode and cathode connection means, stepping means to selectively reduce said controlled electrical potential from a maximum value to at least one intermediate value before reaching a minimum value prior to reversing the polarity of said applied potential, and stepping means to selectively increase said controlled electrical potential from a minimum value to at least one intermediate value before reaching a maximum value after reversal of the polarity of said applied electrical potential.

13. An assembly as claimed in claim 12 wherein said potential control means is adapted to provide a direct current electrical potential between said anode and cathode connection means.

14. An assembly as claimed in claim 12 wherein said direct current potential comprises a half wave rectified power output.

15. An assembly as claimed in claim 12 wherein said direct current potential comprises a full wave rectified power output.

16. An assembly as claimed in claim 12 wherein said stepping means is adapted to vary the magnitude of said potential applied between said anode and cathode connection means between a maximum and minimum value.

17. An assembly as claimed in claim 16 wherein said stepping means is adapted to vary the magnitude of said applied potential through a predetermined number of steps of predetermined magnitude and/or duration.

18. An assembly as claimed in claim 12 wherein said stepping means is adapted to vary the magnitude of said applied potential between a maximum value and a minimum value in a substantially continuous manner at a predetermined rate of change.

19. An electrolytic chlorinator comprising:
   (i) a hollow electrode chamber having gas venting means adjacent an upper end thereof and a liquid inlet port adjacent a lower end thereof, said inlet port being in fluid communication with said electrode chamber, a liquid outlet port located intermediate said upper end of said chamber and said inlet port in fluid communication with said electrode chamber;
   (ii) flotation means associated with said electrode chamber, said flotation means adapted, in use, to maintain said electrode chamber in a substantially upright position;
   (iii) electrode means removably locatable within said electrode chamber; and
   (iv) a controllable power system for supplying electrical power to said electrodes, said controllable power system comprising:
      (a) means for connection to a source of electrical energy;
      (b) cathode connection means for connecting an output of said power supply system to a cathode of an electrolysis apparatus;
      (c) anode connection means for connecting an output of said power supply system to an anode of said electrolysis apparatus;
      (d) voltage control means for applying a controlled electrical potential between said anode connection means and said cathode connection means; and
      (e) reversing means for reversing the polarity of said electrical potential when applied between said anode connection means and said cathode connection means, said reversing means including timer means to control a duty cycle of potential applied between said anode and cathode connection means, stepping means to selectively reduce said controlled electrical potential from a maximum value to at least one intermediate value before reaching a minimum value prior to reversing the polarity of said applied potential, and stepping means to selectively increase said controlled electrical potential from a minimum value to at least one intermediate value before reaching a maximum value after reversal of the polarity of said applied electrical potential.

20. An electrolytic chlorinator as claimed in claim 19 wherein said source of electrical energy comprises an array of photovoltaic cells.

21. An electrolytic chlorinator as claimed in claim 20 wherein said source of electrical energy comprises rechargeable electric batteries.

* * * * *